US012767528B2

(12) United States Patent
Ulber et al.

(10) Patent No.: US 12,767,528 B2
(45) Date of Patent: Oct. 20, 2026

(54) APPARATUS FOR AMMONIA CRACKING HYDROGEN SEPARATION

(71) Applicant: L'Air Liquide, Societe Anonyme pour l'Etude et l'Exploitation des Procedes Georges Claude, Paris (FR)

(72) Inventors: Dieter Ulber, Frankfurt am Main (DE); Johan Vanmanen, Champigny-sur-Marne (FR); Teja Schmid Mcguinness, Frankfurt am Main (DE); Florian Pontzen, Frankfurt am Main (DE); Sophia Schmidt, Frankfurt am Main (DE)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 815 days.

(21) Appl. No.: 18/133,577

(22) Filed: Apr. 12, 2023

(65) Prior Publication Data

US 2024/0343560 A1 Oct. 17, 2024

(51) Int. Cl.

*C01B 3/047* (2026.01)
*B01J 8/06* (2006.01)

(52) U.S. Cl.

CPC ............... *C01B 3/047* (2013.01); *B01J 8/062* (2013.01); *B01J 8/065* (2013.01); (Continued)

(58) Field of Classification Search

CPC ........ B01J 8/062; B01J 8/065; B01J 2208/06; B01J 2208/065; C01B 3/047

See application file for complete search history.

(56) References Cited

U.S. PATENT DOCUMENTS 4,118,204 A * 10/1978 Eakman ................. C10K 1/003 252/373
5,929,126 A * 7/1999 Koveal ................... C07C 1/049 518/715

(Continued)

FOREIGN PATENT DOCUMENTS

CA 3206483 A1 7/2022
CA 3223160 A1 12/2022

(Continued)

OTHER PUBLICATIONS

Wang et al., Ammonia as hydrogen carrier for transportation: investigation of the ammonia exhaust gas fuel reforming, International Journal of Hydrogen Energy 38 (2013) 9907-9917.

(Continued)

*Primary Examiner* — Lessanework Seifu
(74) *Attorney, Agent, or Firm* — Justin K. Murray

(57) ABSTRACT

An apparatus is provided for producing hydrogen in an existing steam methane reformer (SMR) via ammonia cracking, the apparatus comprising: an ammonia storage vessel; a furnace having a plurality of reactor tubes and a plurality of burners, wherein the reactor tubes and the burners are in fluid communication with the ammonia storage vessel, such that the reactor tubes and the burners are configured to receive a flow of ammonia gas sourced from the ammonia storage vessel, and catalytically crack the ammonia within the reactor tubes to produce a crude process gas and a flue gas; a plurality of waste heat recovery sections; a boiler feed water preparation system; means for treating the crude process gas in order to reduce the amount of the unreacted ammonia in the crude process gas, thereby resulting in an aqueous ammonia stream and a washed crude stream; and a pressure swing adsorption (PSA) unit disposed downstream the means for treating the crude process gas.

15 Claims, 7 Drawing Sheets

(52) U.S. Cl.
CPC . *B01J 2208/065* (2013.01); *C01B 2203/0233* (2013.01); *C01B 2203/042* (2013.01); *C01B 2203/0495* (2013.01); *C01B 2203/0811* (2013.01); *C01B 2203/148* (2013.01)

(56) References Cited

U.S. PATENT DOCUMENTS

| | | | | |
|---|---|---|---|---|
| 10,112,829 | B2 | 10/2018 | Ravikumar et al. | |
| 2007/0178034 | A1 * | 8/2007 | Hojlund Nielsen | B01D 53/8612 423/242.1 |
| 2023/0406699 | A1 * | 12/2023 | Nguyen | B01J 19/0013 |
| 2024/0068081 | A1 | 2/2024 | Beyer et al. | |

FOREIGN PATENT DOCUMENTS

| | | | |
|---|---|---|---|
| EP | 4112540 | A1 | 1/2023 |
| WO | 2015074127 | A1 | 5/2015 |
| WO | 2021257944 | A1 | 12/2021 |
| WO | 2022189560 | A1 | 9/2022 |
| WO | 2022243410 | A1 | 11/2022 |
| WO | 2022265651 | A1 | 12/2022 |

OTHER PUBLICATIONS

International Search Report and Written Opinion for related PCT/US2024/024284, Jul. 19, 2024.

International Search Report and Written Opinion for related PCT/US2024/024293, Jul. 19, 2024.

* cited by examiner

APPARATUS FOR AMMONIA CRACKING HYDROGEN SEPARATION

TECHNICAL FIELD OF THE INVENTION

The present invention relates to an apparatus and method for hydrogen production using existing industrial units. More specifically, embodiments of the present invention are related to overcoming obstacles encountered when catalytically cracking ammonia to produce hydrogen, particularly in an existing steam methane reformer that is retrofitted to produce hydrogen from an ammonia feed.

BACKGROUND OF THE INVENTION

Existing $H_2$ production technologies are either too expensive or result in too high of a carbon footprint. For example, $CO_2$-free techniques like water electrolysis are expensive and require large amounts of rare materials. In addition, they are rather difficult to scale up, and they require tremendous new investments in both the electricity supply as well as the electrolysis plants. With energy grids around the world already experiencing strain, electricity, particularly renewable electricity, will become scarce in the years to come.

A decarbonization of state-of-the-art technologies like natural gas (NG)-based steam methane reforming (SMR) by $CO_2$ capture is challenging due to the low $CO_2$ concentration of $CO_2$ in the flue gas. In addition, carbon capture systems (CCS) are not always an option and depend on local geologic prerequisites, regulations, and infrastructure.

The industry is looking to find appropriate ways to decarbonize existing $H_2$ production plants. Decarbonization by means of CCS is not always technically and economically viable. Typically infrastructure and costs for the $CO_2$ handling (e.g., compression/liquefaction, storage, transport/shipping, sequestration) are underestimated. While this solution is an important brick in the path to decarbonization, no long-term experience is available. In addition, a full decarbonization appears to be more attractive since it would have a justification also for long term developments and not only for short to mid-term projects.

In an effort to reduce the effects of carbon dioxide emissions, new energy carriers are becoming increasingly more important. One of the leading energy carriers is hydrogen; however, due to its small molecular size, high pressure requirements, and very low boiling point, transportation of elemental hydrogen is difficult and costly.

Ammonia ($NH_3$) has raised some attention in the literature, since existing infrastructure can be used for storage and transportation (e.g., LPG infrastructure). As such, production of hydrogen using ammonia, instead of natural gas, to produce elemental hydrogen is gaining interest as a viable alternative in the future of the next generation of hydrogen production. Unfortunately, new industrial facilities are quite costly to build and take many years to design and produce. Therefore, it will likely be at least a decade or more before any new dedicated ammonia cracking facilities can be operational. In the interim, it is still desirable to proceed with production of hydrogen in a more environmentally sensitive manner, which includes the cracking of ammonia gas by using existing hydrogen production facilities.

Ammonia can be cracked into hydrogen and nitrogen at ambient pressure and moderate temperatures (450-600° C.) in the presence of a catalyst. In order to save hydrogen compression energy on the backend, it can be advantageous to apply higher pressures for the $NH_3$ cracking reaction (it is easier to compress ammonia gas compared to hydrogen gas due to hydrogen's small molecular size). However, at higher pressures, the cracking reaction is not favored according to Le Chatelier's principle, so higher temperatures are favored (around 700° C.) in order to reach economic conversion rates.

Hydrocarbon-Based SMR Systems

Currently steam methane reformers are operated with hydrocarbon feedstock, such as natural gas, LPG, naphtha, refinery off gas or the like, at temperatures well above 700° C. FIG. 1 represents a typical SMR process flow diagram. Natural gas 2, which is at approximately 30° C., and recycled hydrogen 4 are mixed and warmed in heat exchanger 10 to a temperature of approximately 360° C. to form hot feed stream 12. Hot feed stream 12 is then introduced to a desulfurization unit 20 for removal of sulfur from hot feed stream 12 to form clean hot feed stream 22, which has a significantly reduced amount of sulfur as compared to hot feed stream 12. Clean hot feed stream 22 is then mixed with process steam 24 and heated in SMR heat recovery section 30 before being introduced to pre-reformer 40 in order to convert the heavier hydrocarbons into methane and carbon oxides (CO, $CO_2$) at relatively low temperatures, typically from 400 to 550° C. The lower temperatures of the pre-reformer 40 are used in order to prevent coke deposition on the walls of the reformer 50 and catalyst surface.

A pre-reformer partially completes the steam reforming reactions upstream of the main steam reformer at a much lower temperature using a highly active catalyst. Aside from reducing coke formation, use of the pre-reformer advantageously allows for the conventional steam reformer furnace, which is the most expensive capital item on the plant, to be made smaller.

The pre-reformed stream 42 is then heated in SMR heat recovery section 30 again using the heat from the flue gas of the primary SMR reaction before introduction to the reformer tubes of the SMR furnace 50. After heating, it is sent to steam methane reformer 50 for reforming to create crude syngas stream 52. As the reforming reaction is endothermic, heat is added to the reaction via combustion of a fuel in the burners. The produced crude syngas stream 52 is then fed to a high temperature water gas shift reactor 60, wherein CO reacts with $H_2O$ to convert the CO to $CO_2$ and produce additional hydrogen. The resulting hot shifted stream 62 is then introduced to natural gas preheater 10 in order to provide the preheating of natural gas 2 from earlier, resulting in warm shifted stream 64, which in this embodiment, can have a temperature of approximately 322° C.

Meanwhile, boiler feed water 72 is withdrawn from boiler feed water preparation system 70, pressurized by pump 80 in order to increase boiler feed water pressure for the downstream steam generation system (not shown). Pressurized boiler feed water stream 82, which is at approximately 106° C. and 60 bar (g), is then heated in third heat exchanger 90 using the heat from warm shifted stream 64 in order to produce hot boiler feed water stream 92, which is at approximately 221° C. and colder shift gas stream 94. The hot boiler feed water stream 92 can be used to generate steam in a downstream steam generation system (not shown).

Ammonia Cracking

Process simulations of the ammonia cracking reaction in the proposed pressure range taking into account above temperature limits have shown that the conversion rate of ammonia will be in the range of 95 to 99.8%. The unconverted ammonia content will be in the range of 0.1 to 2.5 mol %, which is above the practical limits of a feed stream for a Pressure Swing Adsorption (PSA) unit.

For example, compared to a PSA feed in an SMR that is operating with standard hydrocarbon feedstock, the hydrogen content for an ammonia feed stream is lower and the nitrogen content is 1 to 2 orders of magnitude higher. Additionally, the ammonia content is several orders of magnitude higher than in a standard SMR plant setup.

Due to these higher values of nitrogen and ammonia, an existing PSA unit would only be able to cope with a smaller flow rate of such a PSA feed stream.

As such, there is a need in the art to provide industrial facilities that can efficiently produce hydrogen from ammonia, particularly by retrofitting existing hydrogen production industrial facilities to produce hydrogen from an ammonia feed gas while overcoming these bottleneck issues of the PSA during operation.

SUMMARY OF THE INVENTION

The present invention is directed to an apparatus and process that satisfies at least one of these needs. In certain embodiments of the invention, a method for producing hydrogen in a steam methane reformer (SMR) via ammonia cracking is provided. The SMR can include a furnace, a pressure swing adsorption (PSA) unit, a plurality of waste heat recovery sections, and means for water washing, wherein the furnace has a plurality of SMR tubes and a plurality of burners. In one embodiment, the method can include the steps of: cracking an ammonia stream in the SMR tubes to produce a crude stream comprising nitrogen, hydrogen, and unreacted ammonia; removing the unreacted ammonia from the crude stream using the means for water washing to produce a washed crude stream and an aqueous ammonia stream; and introducing the washed crude stream into the PSA unit to produce a hydrogen product stream and a PSA off-gas. The washed crude stream preferably comprises less than 100 ppm ammonia.

In another embodiment, a method for producing hydrogen in a retrofitted SMR via ammonia cracking is provided. The SMR can include a furnace, a PSA unit, and a plurality of waste heat recovery sections, wherein the furnace has a plurality of reactor tubes and a plurality of burners. In this embodiment, the method can include the steps of: withdrawing ammonia from an ammonia storage vessel; preheating the ammonia to form a warm ammonia stream; introducing the warm ammonia stream into the reactor tubes of the furnace under conditions effective for catalytically cracking the ammonia, thereby forming a crude stream comprising hydrogen, nitrogen, and unreacted ammonia; treating the crude stream with a water wash in order to reduce the amount of the unreacted ammonia in the crude stream, thereby resulting in an aqueous ammonia stream and a washed crude stream; and introducing the washed crude stream into the PSA unit to produce a hydrogen product stream and a PSA off-gas.

In optional embodiments of the method for producing hydrogen in the retrofitted SMR via ammonia cracking:

- the crude stream has an ammonia concentration in the range of 0.2 to 2.5 mol %, wherein the washed crude stream has an ammonia concentration below 100 ppm, preferably below 20 ppm;
- step (d) is performed in a water wash column, preferably a dedicated water wash column;
- the water wash column is disposed between one of the waste heat recovery sections and the PSA unit;
- an additional demister unit can be used to eliminate/reduce droplet entrainment to the PSA;
- the SMR further comprises a condensate separator disposed upstream of the PSA, the condensate separator being configured to remove condensate formed in the crude stream following cooling in the plurality of waste heat recovery sections, wherein the condensate separator is retroactively configured to conduct step (d);
- the condensate separator is configured to conduct step (d) by adding one or more water injection spray nozzles disposed above a section of bubble cap trays;
- the SMR further comprises a water gas shift reactor disposed between the furnace the plurality of waste recovery sections, wherein the water gas shift reactor is retroactively configured to conduct step (d);
- the water gas shift reactor is configured to conduct step (d) by adding one or more water injection spray nozzles above one or more packing layers, and optionally a liquid level control system, a vortex breaker, and a demister that is preferably disposed downstream in the product gas line;
- the conditions effective for catalytically cracking the ammonia include operating temperatures between 450° C. and 850° C. in the presence of a catalyst selected from the group consisting of ruthenium, nickel, and combinations thereof;
- ammonia is combusted in the presence of oxygen in the burners of the furnace to provide heat for step (c), thereby forming a flue gas;
- the method can also include mixing at least a portion of the aqueous ammonia with the flue gas, preferably either as sole reaction agent for NOx reduction by catalytic and/or non-catalytic conversion or as addition to an anhydrous ammonia reactant stream;
- the method can also include treating the flue gas with a scrubbing unit configured to remove NOx contained within the flue gas;
- the method can also include treating the aqueous ammonia stream to produce recovered ammonia and a cleaned wash water stream using a stripping column; and/or
- the recovered ammonia stream is recycled for use as feed for the reactor tubes and/or used for combustion fuel in the plurality of burners.

In another embodiment, a method for producing hydrogen in a steam methane reformer (SMR) via ammonia cracking is provided. The SMR comprising a furnace, a pressure swing adsorption (PSA) unit, a plurality of waste heat recovery sections, and means for water washing, wherein the furnace has a plurality of SMR tubes and a plurality of burners. In this embodiment, the method can include the steps of: (a) cracking an ammonia stream in the SMR tubes to produce a crude stream comprising nitrogen, hydrogen, and unreacted ammonia; (b) removing the unreacted ammonia from the crude stream using the means for water washing to produce a washed crude stream and an aqueous ammonia stream, wherein the washed crude stream comprises less than 100 ppm ammonia; and (c) introducing the washed crude stream into the PSA unit to produce a hydrogen product stream and a PSA off-gas, wherein step (b) is conducted in a means for water washing that is selected from the group consisting of a dedicated water wash column, a condensate separator that has been reconfigured with one or more water injection spray nozzles disposed above a section of bubble cap trays, and a water gas shift reactor that is reconfigured to include one or more water injection spray nozzles disposed above one or more packing layers.

In another embodiment, a method for retrofitting an existing steam methane reformer (SMR) for ammonia cracking is provided. The existing SMR comprising a desulfurization unit, a furnace, waste heat recovery sections, a water gas shift reactor, and a pressure swing adsorption (PSA) unit, wherein the furnace has a plurality of SMR tubes and a plurality of burners. In this embodiment, the method can include the steps of: providing the existing SMR; taking the desulfurization unit offline such that no fluid flows through the desulfurization during operation; taking the pre-reformer offline such that no fluid flows through the pre-reformer during operation; and adding means for water washing that is configured to remove ammonia from a crude stream comprised of nitrogen, hydrogen, and ammonia, wherein the means for water washing is in fluid communication with and downstream the furnace, wherein the means for water washing is in fluid communication with and upstream the PSA unit.

In optional embodiments of the method for retrofitting an existing steam methane reformer: the means for water washing comprises a dedicated water wash column, preferably equipped with a demister device that is configured to remove water entrained in the product gas stream;

- the means for water washing comprises reconfiguring the water gas shift reactor with a water injection spray nozzle disposed above a packing layer and removing catalyst from the water gas shift reactor, a liquid level control system can also preferably be included;
- the means for water washing comprises reconfiguring a cold condenser separator with a water injection spray nozzle disposed above bubble cap trays, and preferably including a demister disposed downstream in the product gas line;
- the PSA unit comprises activated carbon beds and molecular sieve beds, wherein the method further comprises the step of modifying the PSA unit by decreasing activated carbon beds and increasing a volume of molecular sieve beds; and/or
- the method also includes the step of adjusting a cycle time of the PSA unit based on using a different operating pressure as compared to the existing SMR unit.

In yet another embodiment, an apparatus for producing hydrogen in a steam methane reformer (SMR) via ammonia cracking is provided. In this embodiment, the apparatus can include: an ammonia storage vessel; a furnace having a plurality of reactor tubes and a plurality of burners, wherein the reactor tubes and the burners are in fluid communication with the ammonia storage vessel, such that the reactor tubes and the burners are configured to receive a flow of ammonia gas sourced from the ammonia storage vessel, and catalytically crack the ammonia within the reactor tubes to produce a crude process gas and a flue gas; a plurality of waste heat recovery sections; a boiler feed water preparation system; means for treating the crude process gas in order to reduce the amount of the unreacted ammonia in the crude process gas, thereby resulting in an aqueous ammonia stream and a washed crude stream; and a pressure swing adsorption (PSA) unit disposed downstream the means for treating the crude process gas.

In optional embodiments of the apparatus:

- the crude process gas has an ammonia concentration in the range of 0.2 to 2.5 mol %, wherein the washed crude process gas has an ammonia concentration below 100 ppm, preferably below 20 ppm;
- the means for treating the crude process gas comprise a water wash column;
- the water wash column is disposed between one of the waste heat recovery sections and the PSA unit;
- the apparatus can also include a condensate separator disposed upstream of the PSA, the condensate separator being configured to remove condensate formed in the crude process gas following cooling of the crude process gas in the plurality of waste heat recovery sections, wherein the condensate separator is configured to include the means for treating the crude process gas;
- the condensate separator comprises a water injection spray nozzle above bubble cap trays, and optionally a demister unit disposed downstream the condensate separator that is configured to reduce entrained water of the product gas;
- the apparatus can also include a water gas shift reactor disposed between the furnace the plurality of waste recovery sections, wherein the water gas shift reactor is retroactively configured to include the means for treating the crude process gas;
- the water gas shift reactor comprises one or more water injection spray nozzles disposed above one or more packing layers, and optionally a liquid level control system, a vortex breaker, and a demister that is preferably disposed downstream in the product gas line;
- the means for treating the crude process gas is in fluid communication with a flue gas outlet of the furnace, such that the apparatus is configured to mix at least a portion of the aqueous ammonia with the flue gas;
- the apparatus can also include a conversion unit configured to convert NOx in the flue gas to nitrogen and water, either using a selective catalytic or non-catalytic reduction process;
- the apparatus can also include a scrubbing unit configured to treat the flue gas by removing NOx contained within the flue gas;
- the apparatus can also include a stripping column that is configured to treat the aqueous ammonia stream to produce recovered ammonia and a cleaned wash water stream;
- the apparatus can also include a recycle line that is in fluid communication with a condensate collection point and the stripping column, thereby allowing for additional recovery of ammonia, and/or
- the stripping column is in fluid communication with the plurality of burners, such that the apparatus is configured to recycle the recovered ammonia stream to be used as fuel in the plurality of burners.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

Figure 1:
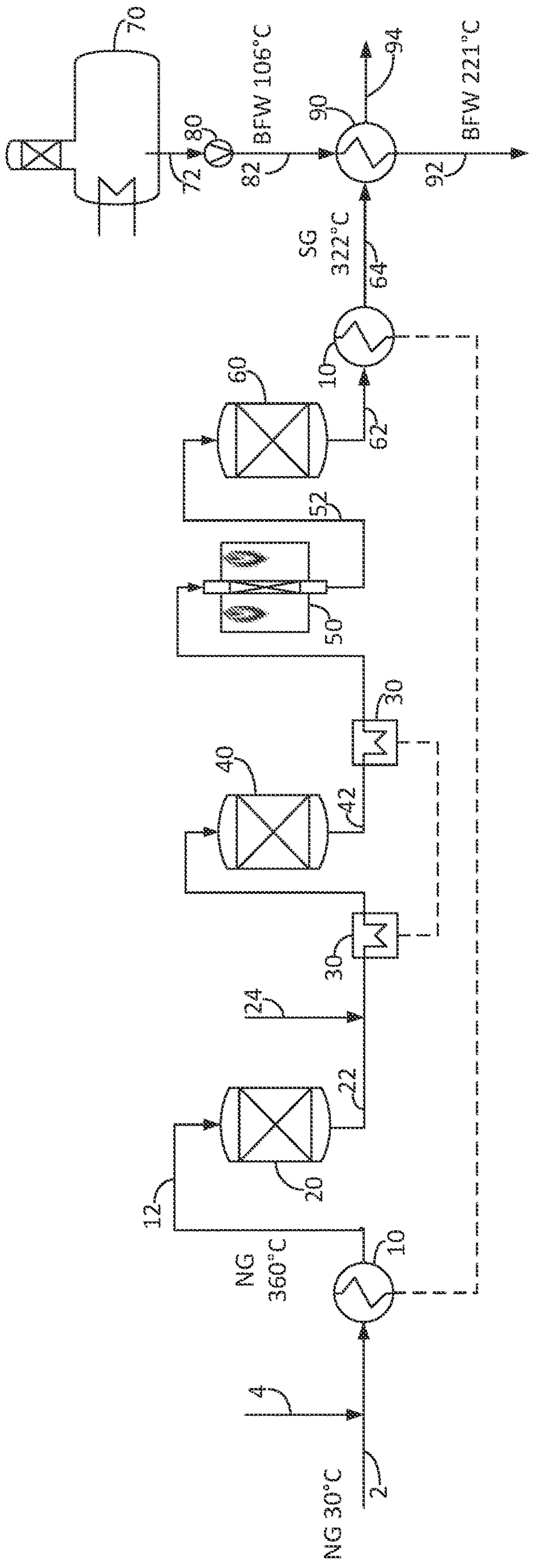
FIG. 1 (PRIOR ART)
FIG. 1 shows an embodiment of a Steam Methane Reformer SMR in accordance with an embodiment of the prior art.

While the invention will be described in connection with several embodiments, it will be understood that it is not intended to limit the invention to those embodiments. On the contrary, it is intended to cover all the alternatives, modifications and equivalence as may be included within the spirit and scope of the invention defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While decarbonization of NG-based $H_2$ production is neither simple nor straight forward for the above-mentioned reasons, it is preferred to operate with a full decarbonization of existing plants based on a replacement of fossil feedstocks by ammonia. Ammonia itself can be produced from various sources and it can be easily transported worldwide by ship, pipeline or truck. It does not contain any carbon atoms. Therefore using it within an SMR yields an intrinsic complete decarbonization of the process. However, a replacement of methane by $NH_3$ is not straightforward, but instead the process requires modifications in order to run safely and reliably. The use of $NH_3$ has several significant advantages compared to NG-based SMR and newly built $NH_3$ crackers:

- $CO_2$ emissions are fully or partly eliminated from the plant.
- No additional infrastructure for CCS, e.g. CC unit, steam supply, $CO_2$ storage, $CO_2$ pipelines, tanks, $CO_2$ ships, sequestration site etc. are needed
- No additional legislation is needed, since $NH_3$ already is traded worldwide, and therefore its production and shipping are well known.
- Existing SMR assets can be utilized, which saves investment costs and allows a faster rollout compared to new greenfield plants.
- In existing basins, the existing infrastructure and connections to customers can be used.
- In the emerging markets, $H_2$ is typically used in new applications that normally don't require steam. If $NH_3$ is used in SMR, the production of steam as byproduct is reduced due to the lower required heat duty of the $NH_3$ splitting reaction. This is beneficial and increases the overall efficiency of the plant compared to one being tailored to high steam export.
- Broader operation range of the plant due to mitigation of the typical challenges in SMR, i.e. coking and metal dusting corrosion.

In principle, methane and $NH_3$ have some similarities and some differences. Ammonia can be decomposed into $N_2$ and $H_2$ in an endothermic reaction (see Reaction Formulas below). The same is valid for methane. However, here the splitting products are carbon and $H_2$. The production of solid C leads to challenges (clogging, fouling, solids handling). Therefore methane is normally converted within a reforming reaction, i.e. including water as a reagent in order to suppress carbon formation. $NH_3$ splitting with this respect is much easier and does not require steam addition.

$NH_3$ decomposition $$2\,NH_3 \rightleftharpoons N_2 + 3\,H_2 + 31\text{ kJ/mol } H_2$$

SMR reaction $$CH_4 + H_2O \rightleftharpoons CO + 3\,H_2 + 69\text{ kJ/mol } H_2$$

SMR + Watergas Shift reaction $$CH4 + 2\,H_2O \rightleftharpoons CO_2 + 4\,H_2 + 41\text{ kJ/mol } H_2$$

In a modified SMR process with 100% $NH_3$ feed, a few process parts are no longer needed, e.g. the desulfurization, pre-reformer, water gas shift section and condensate systems (refer to scheme).

This leads to reduced OPEX and higher reliability since the respective catalyst-containing vessel can be bypassed and therefore don't need regular monitoring or catalyst replacement. This also can reduce overall pressure drops within the system.

On the other hand, the process can include a few additional units for $NH_3$ handling. Some non-limiting examples may include $NH_3$ storage, a feed supply (pump+vaporizer) and optionally an additional water scrubbing downstream the reactor.

A flow scheme for purely $NH_3$-based $H_2$ production is shown in FIG. 1. Ammonia is stored in a suitable storage vessel 1, preferably either as refrigerated fluid at −33° C. and ambient pressure or at elevated pressure and ambient temperature. The liquid $NH_3$ feed is moved by means of a liquid pump 3 against the system pressure (5-40 bar) into the SMR system, where it is bypassing potentially existing feed-pretreatment units 20, 40 (hydrogenation, $H_2S$ adsorption, pre-reforming), preheated in the $NH_3$ preheating section 10 where $NH_3$ is vaporized and heated to suitable inlet conditions of 300-650° C. A part of the $NH_3$ stream may be used as fuel 45 in the SMR furnace 50 if the heating value of the waste gases from the PSA is not sufficient for heating the reaction. In addition, a part of the $H_2$ or the Syngas stream can be used as fuel as well in order to debottleneck the existing heat exchangers. The preheating is done using a hot stream within the waste heat recovery section 10, 90.

The preheated $NH_3$ feed 43 is directed into the SMR reactor 50, i.e. setup with a multitude of tubular reactors situated within a heated furnace. The tubes can be filled with standard reforming catalysts, e.g. based on Ni on Al2O3. In certain embodiments, the catalyst may be replaced by more active catalyst systems, especially for debottlenecking purposes. Within the SMR tubes, the $NH_3$ feed is converted into the product mixture at temperatures of 500-900° C. The gas mixture 53 comprises $N_2$ and $H_2$ as well as traces of unconverted $NH_3$. The heat required for this reaction is provided indirectly through the SMR tube wall from the combustion in the firebox. The hot gas mixture 53 is cooled down in successive heat exchangers (10, 90) within the process gas boiler 90 by means of water vaporization. This generates steam as byproduct. The steam production can be adjusted by adjusting the load to the SMR firebox. For this purpose, additional $NH_3$ may need to be combusted.

In the embodiment shown, the gas mixture 53 bypasses the existing water gas shift reactor 60 and is cooled down in a series of waste heat recovery sections. Following the cooling, condensate 96 is removed from the cooled gas mixture 95 with the resulting dry gas mixture 101 being then sent to a water wash column that is configured to remove unreacted ammonia gas from the dry gas mixture by using pressurized water 84, preferably sourced from the boiler feed water 70. In the embodiment shown, the water wash column is a dedicated vessel that would be added to the existing SMR system.

In the embodiment shown, the new water wash column will be placed in the existing syngas cooling section between the BFW Preheater outlet and the PSA inlet, i.e. below the dew point of the process gas 101, preferably between the final cooler and the PSA inlet. High pressure boiler feed water 84 from the existing units 70 will preferably be used for water dosing.

The water wash column can be designed for an inlet ammonia content in the range 0.2 to 2.5 mol %. As ammonia is very soluble in water, the water wash column can be designed and will reduce the remaining ammonia content in the feed to the PSA to a level below 100 ppm, preferably below 20 ppm and allow feeding the hydrogen and nitrogen mixture to the existing PSA.

The product gas 103 is sent to the pressure swing adsorption (PSA), where the $H_2$ is purified to typically >99.5% purity. The residual gas stream (off-gas) contains $H_2$, $N_2$ and $NH_3$. Wash column effluent stream 104 is withdrawn from the water wash column. In an optional embodiment, at least a portion 88 can be combined with the flue gas 54 of the SMR reactor 50. Optionally, a membrane unit can be used to further treat the residual gas stream (off-gas) in order to further increase hydrogen recovery.

In an embodiment not shown, the off-gas stream from the PSA can be sent to the burners of the SMR in order to provide the heat required for the $NH_3$ decomposition reaction. The presence of a mixture of $H_2$ and $NH_3$ as combustible components is beneficial since the fast $H_2$ combustion and the slow $NH_3$ combustion balance each other and allow using state-of-the-art burners. In certain embodiments, at least 14% $H_2$ is present in the off-gas. In literature it is mentioned, that already 7-10% of $H_2$ are sufficient to allow a smooth co-combustion of $NH_3$ and $H_2$. This also allows additional combustion of $NH_3$ fuel without suffering from slow $NH_3$ combustion.

In another embodiment not shown, the off-gas can be sent back to the SMR reactor tubes in order to more fully convert any residual ammonia, while also recovering additional residual hydrogen.

Figure 3:
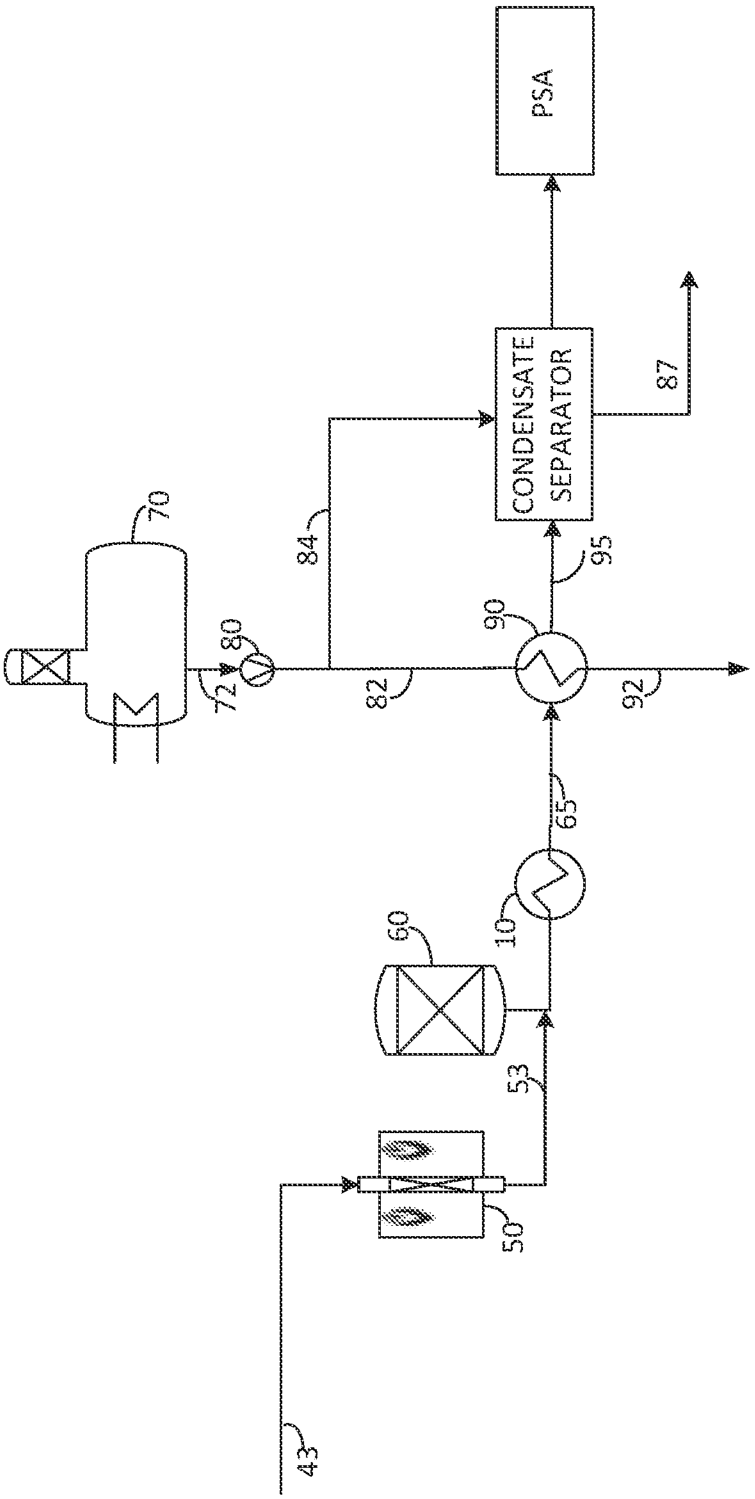
FIG. 3 provides a process flow diagram of another embodiment of the present invention.

FIG. 3 provides a simplified process flow diagram for an alternative embodiments in which the dedicated water wash column is not used to scrub the ammonia from the dry gas mixture 101. Instead, the condensate separator can be revamped with a water injection spray nozzle above bubble cap trays in order to wash out the ammonia. While the figures only show a single box for the condensate separator, the invention is not mean to be limited to a single condensate separator. For example, the present invention can include multiple condensate separators that are operated at different temperatures. In a preferred embodiment, the final separator can also be revamped with an additional section or separator located above the original vessel for liquid separation and a demister for fine droplet removal.

Figure 4:
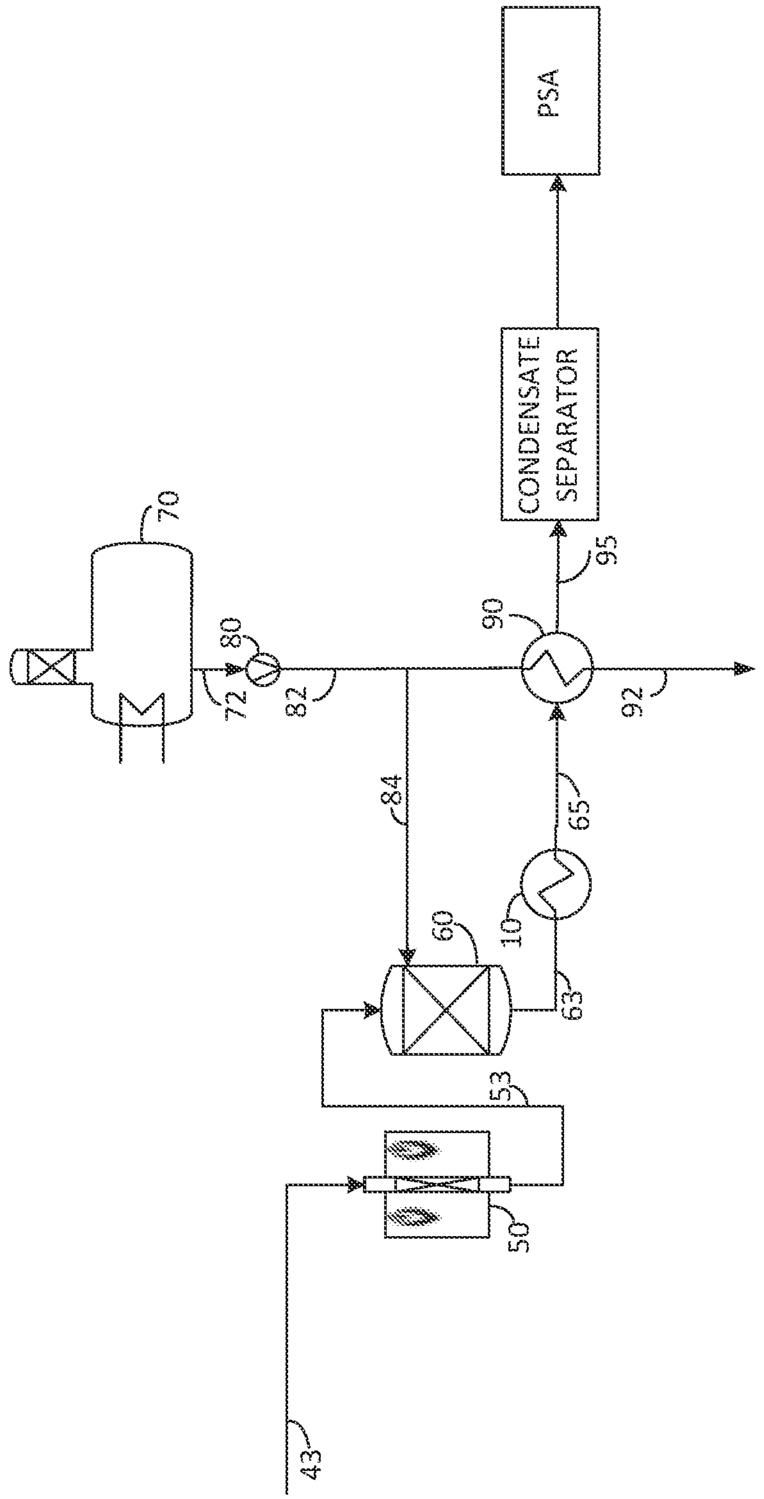
FIG. 4 provides a process flow diagram of another embodiment of the present invention.

FIG. 4 provides another simplified process flow diagram for an alternative embodiments in which the dedicated water wash column is not used to scrub the ammonia from the dry gas mixture 101. Instead, the water gas shift reactor 60 is placed back on-line and water 84 is routed to a top portion of the water gas shift reactor 60 that has been revamped to include a water injection spray nozzle above a packing layer in order to wash out the ammonia. The catalyst can also be removed from this reactor 60, as it is not needed and as it will produce unnecessary pressure drop.

Figure 2:
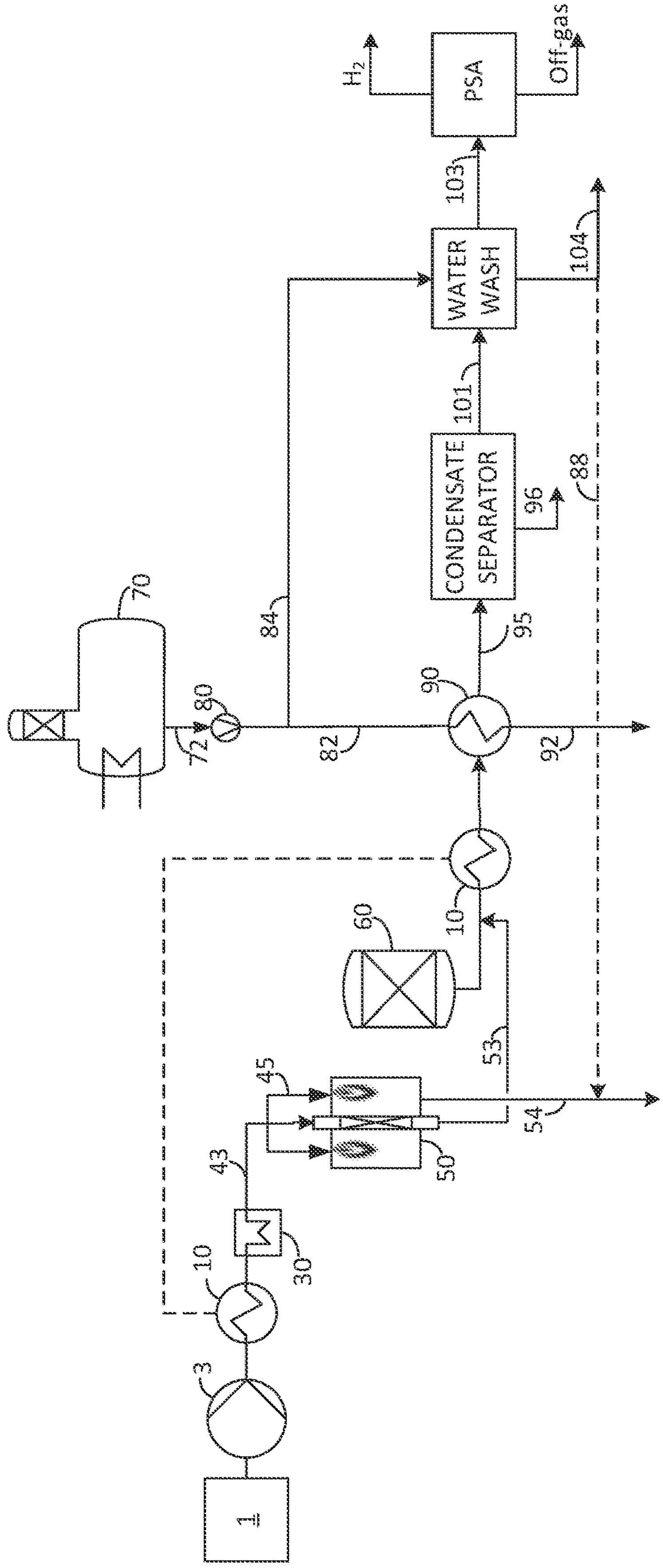
FIG. 2 provides a process flow diagram of an embodiment of the present invention.

FIG. 3 and FIG. 4 are meant to be alternative embodiments to the embodiment shown in FIG. 2. As such, while they do not include all of the specifics shown in FIG. 2, those of ordinary skill in the art will recognize that the FIGS. are not to be so limited. Unless said otherwise, the embodiments shown in FIG. 3 and FIG. 4 can include all of the elements shown in FIG. 2.

Care can also be taken of the NOx levels in the flue gas 54. If needed, an additional De-NOx plant can be foreseen (not shown), which converts NOx with $NH_3$ into $N_2$ and water. Since $NH_3$ is supplied to the site anyway, this is not a challenge and both $NH_3$ applications can be sourced from the same $NH_3$ storage unit. However, it can be more feasible to reduce the amount of extra $NH_3$ fuel (to 10-20%) and co-combust a part of the $H_2$ or Syngas so that the existing heat exchangers can be used and the resulting NOx levels are maintained low enough to either allow a setup without SCR (typically <150 mg NOx per $Nm^3$ flue gas).

The flue gas (i.e., the combustion product) can be redirected from the combustion chamber into the waste heat recovery section (i.e., a series of heat exchangers), in which the heat is used to preheat and superheat various streams (e.g., combustion air, fuel, and feed). In addition, the steam generated in the process gas boiler can be superheated in order to increase its value. The steam is not needed within the process, therefore either it can be exported (if an off taker for the steam is present) or the steam amount should be reduced to a minimum (e.g., by lowering the reaction temperature with the SMR tubes). In this case, more unconverted $NH_3$ is expected in the Syngas product. If enough $NH_3$ is present within this stream it can make sense to add a stripper to obtain a gaseous $NH_3$ stream that can be recycled to the SMR reactor.

If the existing heat exchangers are approaching their limit during the operation with $NH_3$, it may be needed to operate at part load.

Figure 5:
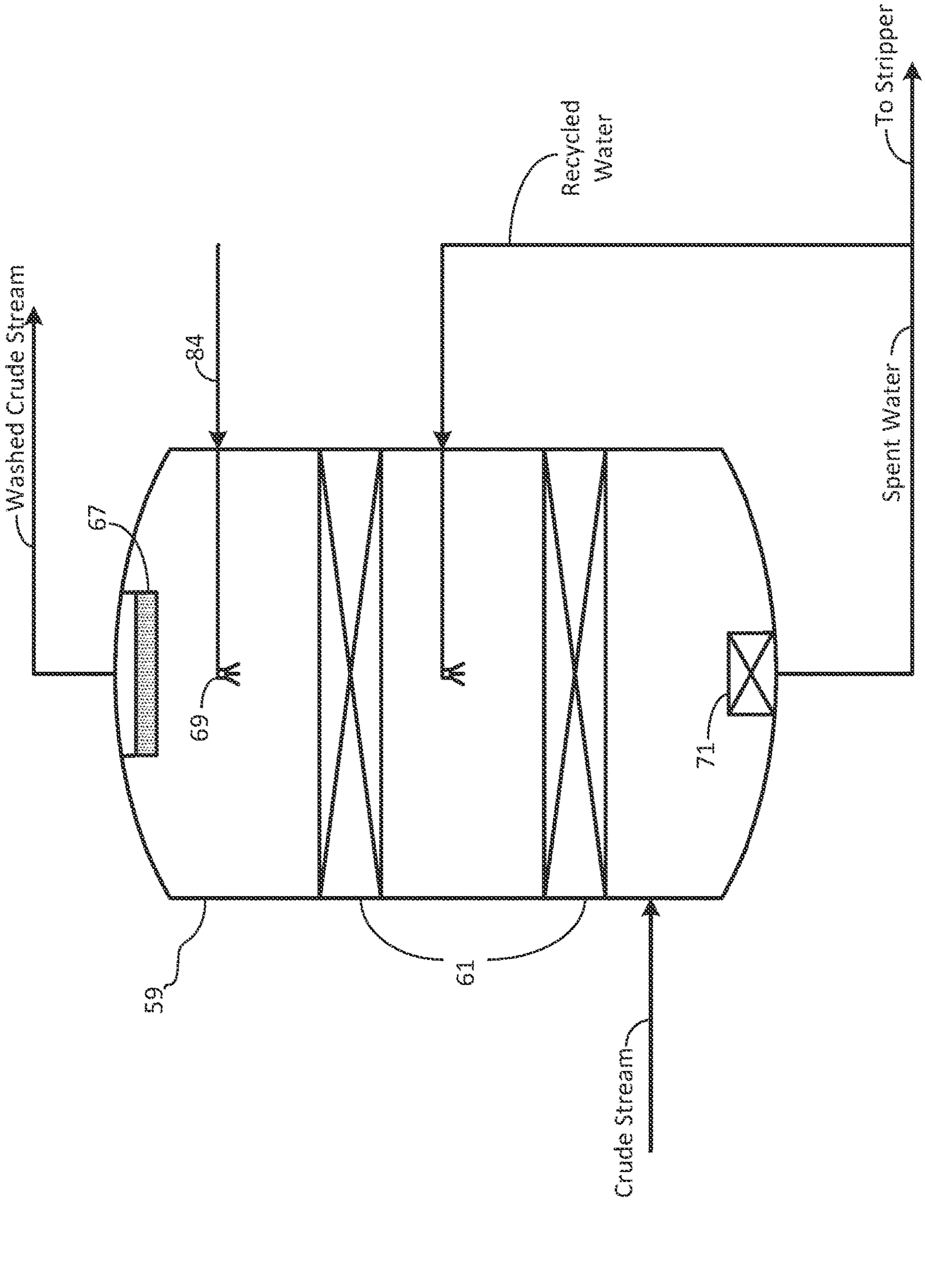
FIG. 5 provides a more detailed showing of an embodiment of the means for water washing.

FIG. 5 provides a more detailed showing of an embodiment with means for water washing 59. Non-limiting examples of acceptable means for water washing can include a dedicated water washing column, a reconfigured water gas shift reactor, and a reconfigured condensate separator. In the embodiment shown, crude stream, which comprises hydrogen, nitrogen, and unreacted ammonia enters means for water washing 59, wherein fresh, demineralized water 84, preferably from the boiler feed water system 70 is injected using one or more spray nozzles 69 that are disposed above one or more contacting means 61, which can include bubble cap trays, packing layers, or the like. The water helps to absorb the unreacted ammonia, thereby removing the vast majority of the ammonia with the water. This spent water stream is removed from a bottom section of the means for water washing 59, wherein a portion can be recycled and used for additional spray nozzles, while the remainder is sent to a stripper for ammonia recovery. The washed crude stream, which contains primarily hydrogen and nitrogen, and preferably ppm levels or less of ammonia, is then withdrawn from a top section of the means for water washing wherein it is eventually sent to the PSA unit for hydrogen separation.

In the embodiment shown, means for water washing 59 can also include a demister 67, which is configured to remove entrained water droplets that might be transported with the gaseous washed crude stream. Additionally, means for water washing 59 can also include a vortex breaker that is located at the exit point of the spent water. The vortex break is configured to prevent gas break through to the liquid pipe and associated problems in the downstream process streams, such as, but not limited to, cavitation in pumps.

Figure 6:
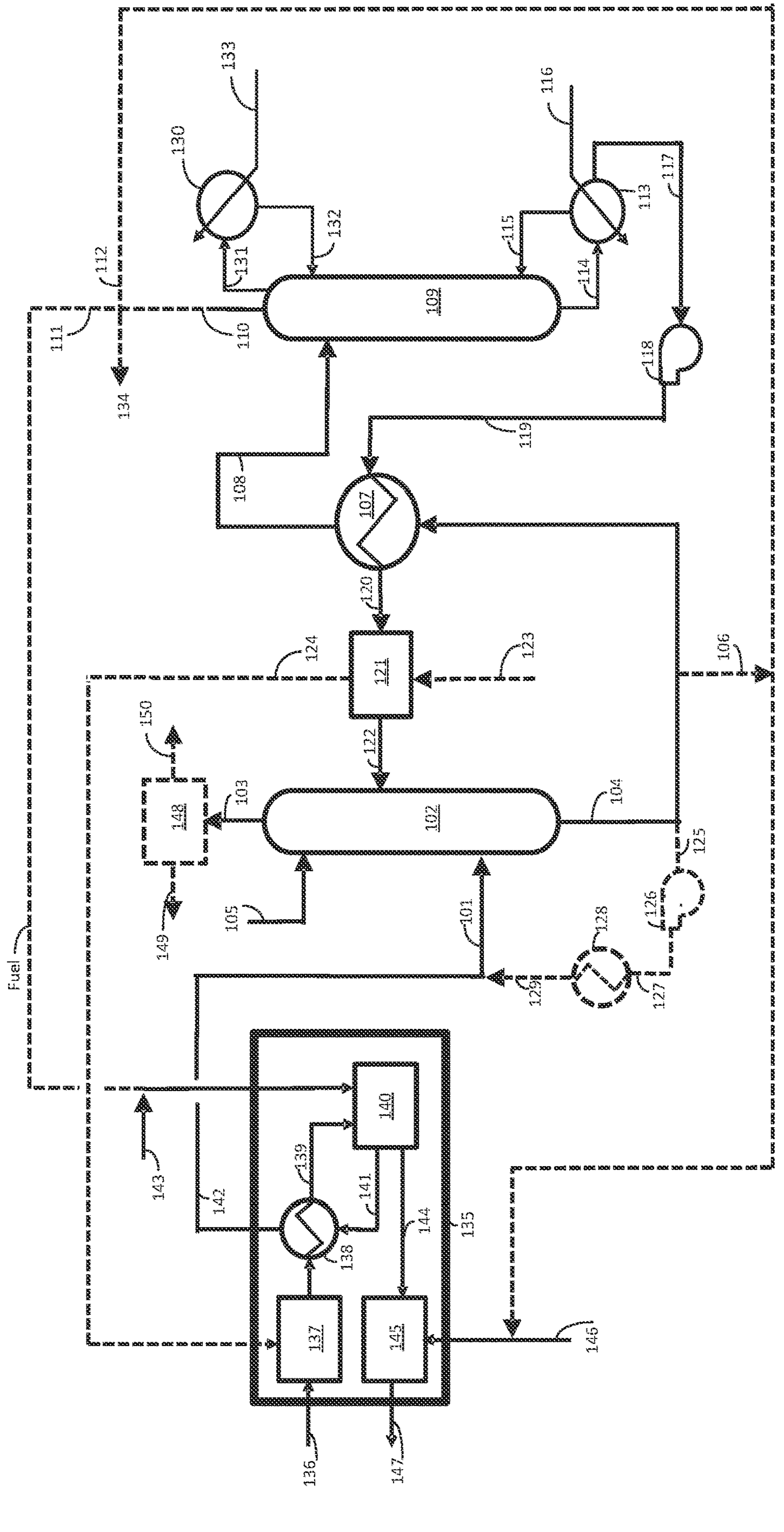
FIG. 6 is a schematic representation a method of separating cracked ammonia gas, in accordance with one embodiment of the present invention.
Figure 7:
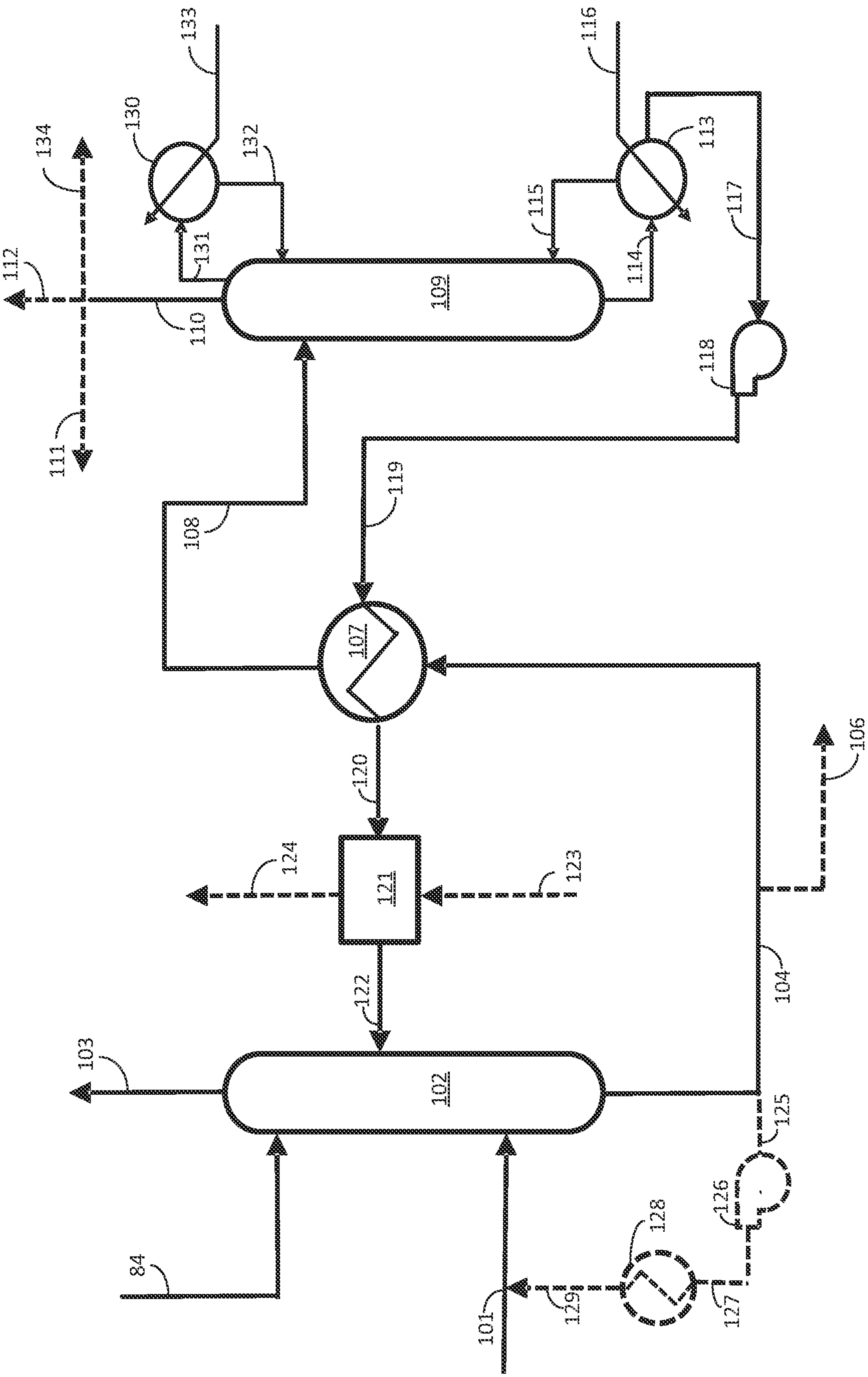
FIG. 7 is a schematic representation a method of separating cracked ammonia gas illustrating additional possible details, in accordance with one embodiment of the present invention.

FIGS. 6 and 7 provide an embodiment with a stripping column used to improve the overall efficiency of an ammonia cracking unit in conformance with certain embodiments of the present invention.

In these embodiments, the proposed process includes an ammonia water wash column and a stripper for the purification of the cracked gas in an ammonia cracker in which the energy for the ammonia cracking is provided via the combustion of an ammonia containing fuel mixture. The fuel includes of ammonia and/or hydrogen and/or nitrogen from cracked ammonia. In a first embodiment not shown, the stripped gaseous ammonia is compressed and recycled to the feed. In contrast, the embodiment shown in FIGS. 6 and 7 avoid the compression device and the gaseous ammonia is recycled to the fuel system. This way, the amount of external ammonia for ammonia cracking can be reduced.

The embodiment shown thus makes use of the high-pressure (typically 20-35 bar) of the cracked gas for ammonia absorption and the lower pressure (typically 1-2 bar (a)) in the fuel system for ammonia desorption. Via thermal integration of the wash-stripping cycle, the fuel stream may be preheated. In addition, it is possible to extract an ammonia containing stream to use in a selective catalytic reduction (SCR, DeNox) unit for the removal of nitrous oxides. During the combustion of an ammonia containing fuel, significant amounts of NOx form, which have to be removed from the flue gas before venting it to the atmosphere.

Turning to FIG. 6, an alternate ammonia cracking unit 135 is illustrated. Ammonia feed stream 136, and optionally warm ammonia feed stream 124, are introduced into ammonia storage tank 137. As needed, ammonia is taken from ammonia storage tank 137 and introduced into ammonia heat exchanger 138, wherein it indirectly exchanges heat with hot cracked ammonia stream 141, thereby producing warm ammonia stream 139 and cooled cracked ammonia stream 142. Ammonia heat exchanger 138 may be heat integrated with reboiler 113, thereby providing at least a portion of the required heat (not shown). Ammonia furnace fuel stream 143, and optionally ammonia fuel stream 111, are introduced into ammonia cracking reactor 140, along with warm ammonia stream 139, thereby producing hot cracked ammonia stream 141 and ammonia furnace raw flue gas stream 144. Ammonia furnace raw flue gas stream 144 is then introduced, along with ammonia stream for SCR 146, and optionally either one or both of first SCR stream 106 and/or second SCR stream 112, into selective catalytic reformer 145, thereby producing treated flue gas stream 147.

Now turning to FIGS. 6 and 7, dry gas mixture 101 is introduced into wash column 102, thereby producing at least clean gas stream 103 and wash column effluent stream 104. At least a portion of dry gas mixture 101 may be cooled cracked ammonia stream 142 from upstream ammonia cracking unit 135. At least a portion of the inlet to wash column 102 may be cooled recycle stream 129. Dry gas mixture 101 may contain unconverted ammonia in the range of 0.003 mol %-10 mol %. The remaining fraction consists of 25 mol % nitrogen and 75 mol % hydrogen.

After exiting ammonia heat exchanger 138, dry gas mixture 101 may enter wash column 102 with a temperature around 35° C. Cooled wash water stream 122 may enter wash column 102 at a temperature between 5° C. and 50° C. Cooled wash water stream 122 may be cooled in wash water cooler 121 using the cold of ammonia feed stream 123, which can be around −33° C., which is thus warmed and resulting warm ammonia feed stream 124 delivered to ammonia cracking unit 135.

Within wash column 102, the ammonia that is present in inlet steam 101 is absorbed in a counter current flow of water and leaves as clean gas stream 103 with a remaining ammonia concentration between of 50 ppm and 2500 ppm. This ammonia concentration in clean gas stream 103 is now low enough to allow the separation of the hydrogen and nitrogen downstream. Clean gas stream 103 may optionally be introduced into hydrogen nitrogen separation unit 148, thereby producing hydrogen-rich stream 149 and/or nitrogen-rich stream 150. Hydrogen nitrogen separation unit 148 may utilize an absorptive or a cryogenic process.

The concentration of ammonia in wash column effluent stream 104 may be in the range of 1 mol % and 20 mol % which is high enough that optionally first SCR stream 106 may be used in selective catalytic reforming (SCR) unit 145. Optionally, in order to increase the ammonia concentration in wash column effluent stream 104, recycle stream 125 may enter recycle pump 126, thereby producing pressurized recycle stream 127. Pressurized recycle stream 127 may enter recycle cooler 128, thereby producing cooled recycle stream 129. Cooled recycle stream 129 may then be introduced into wash column 102.

Wash column effluent stream 104 may then exchange heat indirectly in heat exchanger 107 with pressurized wash water stream 119, thereby producing cooled effluent stream 108, and warmed wash water stream 120. Cooled effluent stream 108 is loaded with ammonia and is then to be treated in stripper/recovery column 109. Warm condenser stream 131 exits stripping column 109 and enters condenser 130, wherein it is condensed (and cooled) by cold condenser inlet stream 133, thereby producing cold condenser stream 132. As cold condenser stream 132 reenters stripping column 109, the fluid inside is cooled. By controlling the reflux flowrate through condenser 130, and the flowrate and temperature of cold condenser inlet stream 133, the temperature and water content of recovered ammonia stream 110 may be adjusted. Reboiler liquid stream 114 exits stripping column 109 and enters reboiler 113, wherein it is heated and vaporized by reboiler heat input stream 116, thereby producing reboiler vapor stream 115. As reboiler vapor stream 115 reenters stripping column 109, the ammonia within is evaporated. Reboiler heat input stream 116 may be steam. As an alternative to steam stream 116, reboiler 113 may be directly thermally integrated to the waste heat recovery system of the cracking process (not shown).

Recovered ammonia stream 110, is a gas containing recovered ammonia in the range of 20 mol %-100 mol %, with the remaining fraction being predominantly water. As the pressure is at around 2 bar, at least a portion, 111, may be recycled to fuel stream 143 of ammonia cracking unit 135 or a portion, second SCR stream 112, may be sent to SCR unit 145 without the need of compression. In one embodiment, at least a portion, recovered ammonia product stream 134, of recovered ammonia stream 110 is removed from the system as a product stream. Due to the temperature range of recovered ammonia stream 110 being between 30° C. and 120° C., it may be used to thermally integrate another stream of the plant, such as the preheating of the combustion air or fuel (not shown).

Cleaned wash water stream 117 has the pressure increased in wash water pump 118, thereby producing pressurized wash water stream 119. Pressurized wash water stream 119 then exchanges heat with wash column effluent stream 104, thereby producing warmed wash water stream 120. Warmed wash water stream 120 is cooled in wash water cooler 121, thereby producing cooled was water stream 122. Cooled wash water stream 122 is reintroduced into wash column 102, and thus continuously cycled. The lost water in recovered ammonia stream 110 is made up with makeup water stream 105.

The SCR process is exothermic, exhibits a temperature window for optimal operation and required dosing of ammonia. The temperature in the SCR can be influenced by the selection of the ammonia stream. Stream 104 is liquid and stream 110 is gaseous. Choosing one of these streams or a mixture thereof for the ammonia dosing, the temperature in the flue gas duct can be adjusted and the addition of external ammonia for the SCR unit can be reduced or avoided.

tially of the elements disclosed and may be practiced in the absence of an element not disclosed. Furthermore, language referring to order, such as first and second, should be understood in an exemplary sense and not in a limiting sense. For example, it can be recognized by those skilled in the art that certain steps or devices can be combined into a single step/device.

The singular forms “a”, “an”, and “the” include plural referents, unless the context clearly dictates otherwise. The terms about/approximately a particular value include that particular value plus or minus 10%, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

| Stream | Parameter | Case 1 | Case 2 | Case 3 | Case 4 | Case 5 | Case 6 |
|---|---|---|---|---|---|---|---|
| 101 | c($NH_3$) in mol % | 0.3 | 0.3 | 10 | 10 | 0.3 | 10 |
| 101 | T in ° C. | 35 | 35 | 35 | 35 | 25 | 25 |
| 101 | p in bar(a) | 25 | 25 | 25 | 25 | 25 | 25 |
| 103 | c($NH_3$) in ppm | 50 | 2500 | 50 | 2500 | 5 | 5 |
| 104 | c($NH_3$) in mol % | 4 | 5 | 12 | 15 | 4 | 12 |
| 110 | c($NH_3$) in mol % | 99.6 | 99.7 | 99.9 | 99.9 | 99.6 | 99.9 |
| 110 | T in ° C. | 48 | 46 | 42 | 41 | 47 | 42 |
| 110 | p in bar(a) | 2 | 2 | 2 | 2 | 2 | 2 |
| 116 | Q in kW/kg $NH_3$ recovered | 3 | 2 | 1 | 1 | 3 | 1 |
| 105 | Makeup water/ Circulating water Mass flow basis | 3% | 21% | 0.5% | 2% | 2% | 0.3% |

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above Those of ordinary skill in the art will recognize that a selected process design depends on the targeted overall $NH_3$ conversion, space restrictions of the site, as well as required purity of the $H_2$ product.

As used herein, a “retrofitted SMR” can encompass the resulting hydrogen production plant following alteration of an existing SMR facility, which can include upgrade of materials, as well as adding, removing, or bypassing certain pieces of equipment.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations that fall within the spirit and broad scope of the appended claims. The present invention may suitably comprise, consist or consist essen-

We claim:

1. An apparatus for producing hydrogen in a steam methane reformer (SMR) via ammonia cracking, the apparatus comprising:

an ammonia storage vessel;

a furnace having a plurality of reactor tubes and a plurality of burners, wherein the reactor tubes and the burners are in fluid communication with the ammonia storage vessel, such that the reactor tubes and the burners are configured to receive a flow of ammonia gas sourced from the ammonia storage vessel, and catalytically crack the ammonia within the reactor tubes to produce a crude process gas and a flue gas;

a plurality of waste heat recovery sections;

a boiler feed water preparation system;

means for treating the crude process gas in order to reduce the amount of the unreacted ammonia in the crude process gas, thereby resulting in an aqueous ammonia stream and a washed crude stream;

a water gas shift reactor disposed between the furnace and the plurality of waste recovery sections, wherein the water gas shift reactor is retroactively configured to include at least a portion of the means for treating the crude process gas; and a pressure swing adsorption (PSA) unit disposed downstream the means for treating the crude process gas.

2. The apparatus as claimed in claim 1, wherein the crude process gas has an ammonia concentration in the range of 0.2 to 2.5 mol %, wherein the washed crude process gas has an ammonia concentration below 100 ppm.

3. The apparatus as claimed in claim 1, further comprising a demister that is disposed either within or downstream the means treating the crude process gas, wherein the demister is disposed upstream of the PSA unit.

4. The apparatus as claimed in claim 1, wherein a portion of the means for treating the crude process gas comprises a water wash column.

5. The apparatus as claimed in claim 4, wherein the water wash column is disposed between one of the waste heat recovery sections and the PSA unit.

6. The apparatus as claimed in claim 1, wherein the apparatus further comprises a condensate separator disposed upstream of the PSA, the condensate separator being configured to remove condensate formed in the crude process gas following cooling of the crude process gas in the plurality of waste heat recovery sections, wherein the condensate separator is configured to also include a portion of the means for treating the crude process gas.

7. The apparatus as claimed in claim 6, wherein the condensate separator comprises one or more water injection spray nozzles disposed above a section of bubble cap trays.

8. The apparatus as claimed in claim 1, wherein the water gas shift reactor comprises one or more water injection spray nozzles disposed above one or more packing layers.

9. The apparatus as claimed in claim 1, wherein the water gas shift reactor further comprises a liquid level control system, a vortex breaker, and a demister.

10. The apparatus as claimed in claim 1, wherein the means for treating the crude process gas is in fluid communication with a flue gas outlet of the furnace, such that the apparatus is configured to mix at least a portion of the aqueous ammonia with the flue gas.

11. The apparatus as claimed in claim 1, further comprising a scrubbing unit configured to treat the flue gas by removing NOx contained within the flue gas.

12. The apparatus as claimed in claim 1, further comprising a conversion unit configured to convert NOx in the flue gas to nitrogen and water, either using a selective catalytic or non-catalytic reduction process.

13. The apparatus as claimed in claim 1, further comprising a stripping column that is configured to treat the aqueous ammonia stream to produce recovered ammonia and a cleaned wash water stream.

14. The apparatus as claimed in claim 13, wherein the stripping column is in fluid communication with the plurality of burners, such that the apparatus is configured to recycle the recovered ammonia stream to be used as fuel in the plurality of burners.

15. The apparatus as claimed in claim 13, further comprising a recycle line that is in fluid communication with a condensate collection point and the stripping column, thereby allowing for additional recovery of ammonia.

* * * * *